Sept. 11, 1951  C. R. ANDERSON  2,567,310
ARTIFICIAL BAIT
Filed Oct. 19, 1946

INVENTOR
CARL R. ANDERSON
BY
*Rummler, Rummler & Davis*
ATTORNEYS

Patented Sept. 11, 1951

2,567,310

UNITED STATES PATENT OFFICE 2,567,310

ARTIFICIAL BAIT

Carl R. Anderson, Chicago, Ill.

Application October 19, 1946, Serial No. 704,436

2 Claims. (Cl. 43—35)

This invention relates to artificial bait or fish lures and particularly to such devices of the plug type suitable for casting and trolling and having a spring actuated hook, which upon being released, by contact of the striking fish, is projected forceably outward from the bait body to hook the fish.

The present invention is a further development of the invention for fish lure disclosed in my copending application Serial No. 659,510, filed April 4, 1946, which has become abandoned.

The main objects of this invention are to provide an improved fish lure or artificial bait having a spring actuated hook; to provide such a device having an externally disposed hook the barb of which is normally concealed; to provide such a device wherein the hook is released upon engagement by a striking fish and forceably projected to engage in the fish's mouth; to provide an improved artificial bait having an externally disposed spring actuated hook that is substantially "weedless" and snag-proof; and to provide such a device of a more simple construction that is less costly to manufacture.

A specific embodiment of this invention is shown in the accompanying drawings wherein Figure 1 is a top plan view of the improved artificial bait.

Figure 1:
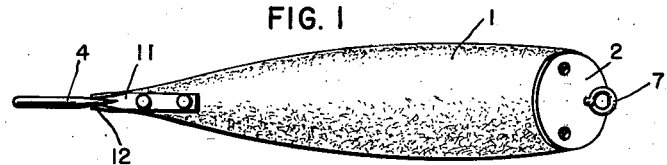

As shown in the drawings, the improved artificial bait or fish lure comprises a body 1 made of wood, or any other suitable material, having the general shape or contour of a small fish, as is usual with fish lures of the plug type. As is customary, the forward or leading end of the body is provided with an inclined downwardly projecting wobble plate 2 disposed at an angle to the longitudinal axis of the bait body and adapted to cause a motion of the body, as it is towed through the water, that will simulate the motion of a live fish.

Figure 2:
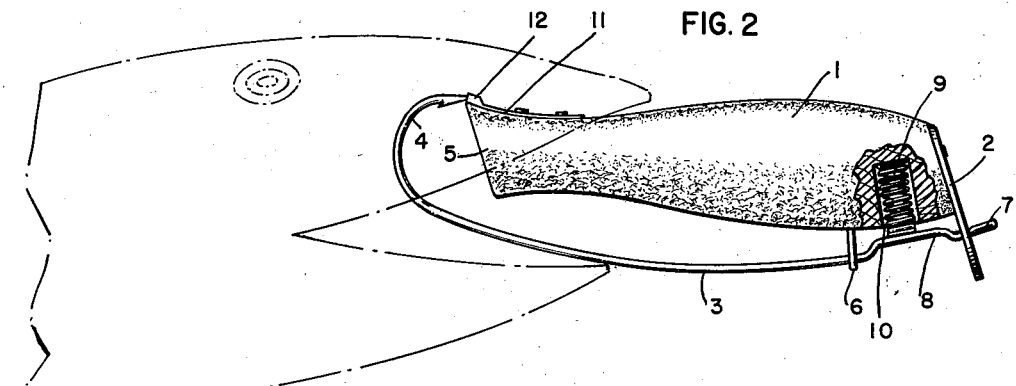
Fig. 2 is a side elevation of the same partly in section showing the hook actuating means.
Figure 3:
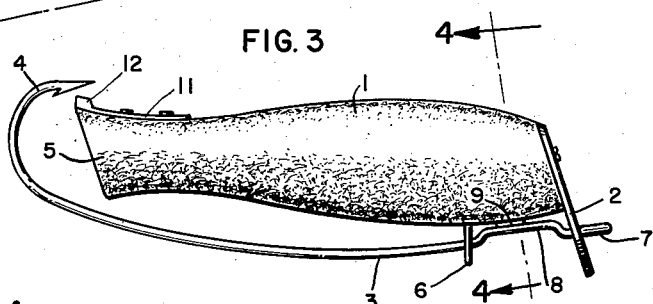
Fig. 3 is a view similar to Fig. 2 showing the hook released from its seat for spring actuation to project the hook laterally from the bait body.

The hook 3, which is made of a suitably resilient material such as spring steel, is provided with a curved shank of somewhat greater length than the bait body and is disposed substantially longitudinally of the body 1 along the underside thereof with the hook or barbed portion 4 curving upwardly and over the tail end 5 of the body 1. The shank of the hook 3 is supported on the body 1 by means of a staple or bearing means 6 spaced rearwardly of the wobble plate 2 and looped over the shank, and the leading end of the hook shank extends through a suitable opening in the downwardly projecting portion of the wobble plate 2 where the shank end is bent circularly upon itself to provide an anchoring eye 7 of larger size than the plate opening. The wobble plate 2 and the bearing means or staple 6 thus provide longitudinally spaced supports in which the hook shank is pivotedly mounted and secured to the body 1 for pivotal or turning movement substantially about the shank axis. As shown in Fig. 2 the hook shank is curved continuously from the bearing 6 to its barbed end 4 and the curved portion extends beneath the bait body in spaced outwardly bowed relation thereto.

Figure 4:
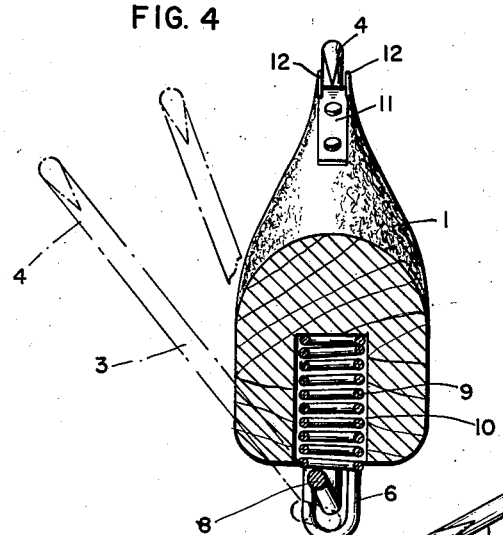
Fig. 4 is an enlarged sectional view as taken on line 4—4 of Fig. 3 showing the hook actuating mechanism and illustrating, in dotted outline, the path of the hook in its movement toward projected position.
Figure 5:
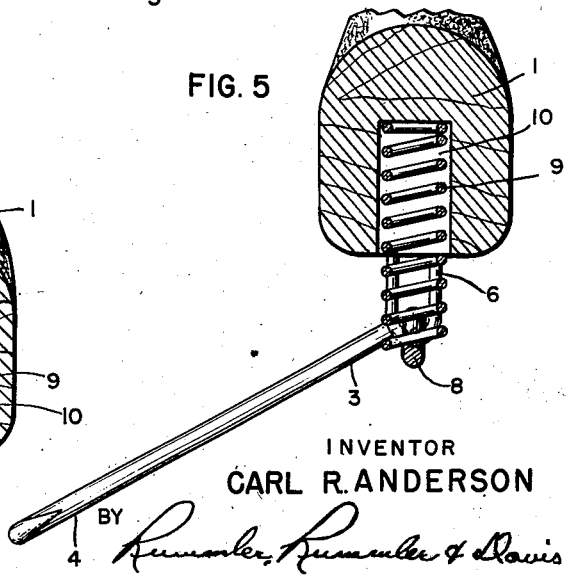
Fig. 5 is a view similar to Fig. 4 showing the hook in its maximum or fully projected position.

Intermediate the wobble plate 2 and the staple 6 the shank of the hook 3 is bent to form a crank-like portion 8 which projects upwardly toward the body 1 and which is offset angularly relative to the plane of the curved shank and barbed portions 4 of the hook, as shown in solid outline in Fig. 4. A coiled spring 9, or other suitable resilient means, is housed within a recess 10 in the bait body and is arranged to bear upon the crank portion 8 of the hook shank, the spring 9 being compressed within the bore 10 so as to normally exert a force outwardly therefrom.

Thus the spring 9, bearing on the crank portion 8 of the hook shank 3, presses the hook shank toward the loop of the staple 6 and against the lower margin of the aperture in the wobble plate 2; and due to the angularly offset relation of the crank portion 8 the spring exerts a turning moment or force on the hook shank which would normally cause the hook shank to pivot or rotate, substantially on its own axis, so as to swing the barbed portion 4 laterally outward and away from the body 1.

As shown in Figs. 1 and 2, the barbed portion 4 of the hook, which extends upwardly around and over the upper edge of the tail portion of the body 1, is engaged in a seat 11, having a pair of spaced upwardly projecting wings or retaining means 12, 12 which abut against the sides of the hook tip and normally hold the hook against sidewise or lateral displacement.

The pressure of the spring 9 on the shank portion of the hook tends to force the hook downwardly relative to the bait body and holds the tip of the hook securely between the wings 12 of the seat member 11.

Thus the artificial bait normally has the barbed portion of the hook extending upwardly and forwardly over the tail portion of the bait body with the tip of the hook overlapping the body and seated or housed between the wings or retaining means 12, the tension of the spring 9 holding the hook in its normal seated position, and the bait may be used for casting or trolling by tying the end of the fishing line, not shown, onto the eye portion 7 of the hook shank.

Upon being engaged by the striking fish, the upper and lower jaws of the fish will clamp onto the bait body 1 and the hook shank 3 so as to cause the barbed portion 4 to be raised resiliently against the action of the spring 9 and disengaged from the retaining means 12. Immediately following this the tension of the spring 9 acting on the angularly offset crank portion 8 of the hook shank will cause the hook to pivot or turn, on the axis of the shank, and rotate the barbed portion 4 laterally outward with sufficient force to cause the barbed tip of the hook to engage securely in the fish's mouth.

Because of the outwardly bowed form of the hook shank the barbed end of the hook will be projected outwardly in an increasing arc, immediately upon its being released from the retaining means 12, thereby assuring that the barbed end of the hook will be forcibly engaged in the fish's mouth even though the fish might open its mouth in an attempt to release the bait.

After the fish has been landed and the hook disengaged from the fish's mouth the bait can be readily reset by merely grasping the curved end of the hook and turning the hook so as to swing its barbed tip over and above the tail of the bait so that the tip of the hook can be seated between the wing portions 12 of the seat 11. The bait is then in condition for immediate fishing use.

The main advantages of this invention reside in its simple construction and in the arrangement whereby an externally mounted hook, tripped by the action of the fish itself, is forceably actuated to drive the barbed portion of the hook into fish's mouth as soon as the bait is engaged by a striking fish. Other advantages are to be found in the arrangement whereby a hook having considerable actuating force is released by the striking fish without the aid of tripping or trigger mechanism. Still further advantages are to be found in the streamlined arrangement of the artificial bait whereby the tip of the hook is normally housed and the bait is free of any projections which might catch on weeds or cause the bait to become snagged. And still further advantages are to be found in the few simple parts required for the construction of the artificial bait whereby its manufacture can be accomplished at a relatively low cost.

Although but one specific embodiment of this invention is herein shown and described, it will be understood that details of the construction shown may be altered or omitted without departing from the spirit of this invention as defined by the following claims.

I claim:

1. An artificial bait construction comprising a body having a fish-like tail portion, an inclined wobble plate mounted rigidly across the front end of the body and projecting downwardly beyond the same, a hook having a curved shank bowed outwardly relative to said body and extending along the bottom of said body with its barbed end curved around the tail of said body and engaged on the opposite side thereof, the shank of said hook extending forwardly through the projecting portion of said wobble plate and terminating in an eye on the front side of the same, said plate having an aperture to receive said shank and said eye being larger than said aperture, a crank formed in said shank immediately behind said plate said crank being offset angularly relative to the plane of said hook, said body having a recess formed therein which opens toward said crank, a helical compression spring having one end seated in said recess and bearing directly upon said crank to normally urge said crank rotatively away from said body, and a bearing means fastened to said body behind said crank and looped over said shank, said bearing means being formed to loosely support said shank and retain said crank substantially parallel with said body, and said hook shank being continuously curved from said bearing means to its barbed end whereby the barbed end will be forcibly driven in an outwardly increasing arc upon being disengaged from said tail.

2. An artificial bait construction comprising a body having a fish-like tail portion, a wobble plate mounted fast across the front end of said body and projecting below the same, a hook having an outwardly bowed shank extending along the under side of said body and its barbed end curved upwardly over the tail of said body and engaged thereat, the shank of said hook extending forwardly through said wobble plate and terminating in an eye on the front side of the same, said plate having an aperture to receive said shank and said eye being larger than said aperture, a crank formed in said shank immediately behind said plate and offset angularly relative to the plane of said hook, said body having a recess formed therein directly above said crank, a helical compression spring seated in said recess and bearing directly upon said crank to normally urge said shank rotatively away from said body, and a bearing means fastened to said body behind said crank and looped over said shank, said bearing means being formed to loosely support said shank for limited movement toward and away from said body and retain said crank substantially parallel with said body, and said hook shank being continuously curved from said bearing means to its barbed end to swing forcibly in an outwardly increasing arc upon being disengaged from said tail.

CARL R. ANDERSON.

REFERENCES CITED

The following references are of record in the file of this patent:

UNITED STATES PATENTS

| Number | Name | Date |
| --- | --- | --- |
| 1,723,193 | McLaughlin | Aug. 6, 1929 |
| 1,774,539 | Ahlfors | Sept. 2, 1930 |
| 1,808,565 | McLaughlin | June 2, 1931 |
| 2,017,903 | Johnson | Oct. 22, 1935 |
| 2,424,096 | Janchan | July 15, 1947 |
| 2,441,302 | Watkin | May 11, 1948 |